UNITED STATES PATENT OFFICE 2,290,452

METHOD AND COMPOSITION FOR WAXING FRUIT

Jagan N. Sharma, Los Angeles, Calif., assignor to Food Machinery Corporation, San Jose, Calif., a corporation of Delaware No Drawing. Application February 9, 1940, Serial No. 318,135

6 Claims. (Cl. 99—168)

This invention relates to the preparation of fresh fruit and vegetables for market, and particularly to the treatment thereof for the purpose of retarding shrinkage.

The processing of fresh fruits and vegetables commercially in preparing these for market, has two general purposes: The first of these is to see that the fruit is clean. The second is to do whatever possible to retard the withering or shrinkage of the fruit so that it will be in as fresh a condition as possible when delivered to the ultimate consumer. Many farm products, such as citrus fruits, apples, potatoes and the like, are more or less dirty when harvested. In order to clean these, they are put through a washing process. Nature provides most fruits and vegetables with a natural waxy coating to protect them from drying up and withering. The washing process tends to impair this natural coating and it has been found that the shrinkage rate for these products can be greatly reduced, after they have been washed, by the addition thereto of relatively small amounts of a preservative coating material such as paraffin wax.

There are various ways of applying wax to fresh fruits and vegetables, one of the most satisfactory being to dissolve the wax in a volatile solvent and apply this solution to the fruit. I have found it especially suitable to form such a solution with a highly volatile solvent and spray this solution onto the fruit or vegetables in such small quantities as to cause no dripping of the solution therefrom, and then let the solvent evaporate without brushing or otherwise disturbing the solution on the fruit.

The use of a solution of wax for applying the latter to fresh fruits and vegetables has these advantages: The wax is thus easy to apply; it may be applied without damaging the fruit or vegetables in any way; the solvent dries quickly, thus rapidly incorporating the applied wax with the natural protective waxy coating of the fruit; the process is economical in the use of applied wax; while finally, this process makes it easy to regulate the amount of wax applied to the fruit and yet keep this within such limits as will give the needed shrinkage control, yet not prevent adequate respiration of the fruit while this is en route to market.

The application of wax in a solution to fresh fruits and vegetables has the draw-back, however, that if enough wax is put in to obtain the desired control it may precipitate out of solution on cold mornings. This puts solid particles of wax on the fruit, which is undesirable not only from the standpoint of appearance but also in obtaining uniformity of application. Moreover, when the solution is sprayed on, any solid particles of wax in the solution may clog the nozzles.

It is an object of my invention to provide a method of and composition for waxing fresh fruits by the use of a solution of wax which will permit the necessary amount of wax to be used in the solution without the wax separating out of the solution on the cold mornings met with in ordinary commercial practice.

As it adds considerably to the marketability of fresh fruit and vegetables for these to have a bright appearance, it is very desirable that the processing of these incidental to their being packed for shipment leave them with a relatively glossy surface. While paraffin has excellent preservative qualities, and is therefore very suitable as a coating material for aiding in reducing the shrinkage of fresh fruits and vegetables, it has a relatively dull texture and does not give the fruit on which it is applied so bright a surface as is generally desired by the packers.

It is another object of my invention to provide a method of and composition for waxing fresh fruits and vegetables by applying a clear wax solution thereto which not only affords the desired degree of shrinkage control but bestows an adequate degree of brightness upon the surface of the product treated.

In employing wax solutions for the waxing of fruit, it has been customary in the art to use between 3% and 10% of wax in the solution. Heretofore, the percentage of wax employed in the solution has been determined by the minimum temperatures under which the process is required to operate. During the winter, when temperatures are relatively low, particularly in the mornings when starting work, the amount of wax has been decreased to as little as 5% and sometimes less, whereas in the summer, and particularly in the warmer sections of the country as in Imperial Valley, California, 10% of wax may be used in the solution without any danger of the wax precipitating out. While the desired degree of shrinkage control is obtainable with the lower concentrations of wax in the solution, this has been achieved by applying a larger amount of solution to the fruit than is necessary where the solution contains a larger amount of wax. For example, where a given degree of shrinkage control is obtained by applying a given quantity of 10% solution to the fruit, it would be necessary to apply approximately twice as much of a 5% solution to achieve the same degree of control.

In order to save in the amount of solvent required to apply a given amount of wax to the fruit, therefore, it is necessary to utilize as large a percentage of wax in the solution as will safely remain in solution during the lower operating temperatures.

By the use of my invention, I am enabled to provide a wax solution which has 7% of wax in it but which will not precipitate out at the lowest operating temperatures ordinarily met with commercially. With this amount of wax in solution, the process of waxing fruit by a solution of wax may be economically and efficiently performed and I am thus able to obtain the advantages of this method without incurring the disadvantages above referred to.

Moreover, the composition and method of my invention imparts a much higher degree of gloss to the products treated than resulted from the previous methods of waxing such products with wax solutions.

Waxes may be grouped in accordance with their origin, under the headings "mineral," "vegetable," and "animal." For instance, mineral waxes includes paraffin and ozocerite; vegetable waxes include coconut fat and stearic acid; and animal waxes include bees wax and spermaceti.

I have discovered that by combining waxes from different ones of these groups in a solvent, I can obtain a given concentration of wax in the solution and yet have a lower precipitation point for this solution than would be the case where the same amount of any one kind of wax were present in the solution. Thus, I am able to provide a solution containing a total of 7% of wax for the waxing of fresh fruits and vegetables in which the wax will stay in solution even though the operating temperature drops far below the point at which the wax would precipitate out were a solution being used, for instance, which contained 7% of paraffin alone. At the same time, I am able to obtain, with such a solution, an efficiency as to the quantity of solution required and as to the degree of shrinkage control produced by its application which is equivalent, if not superior, to a solution containing an equal quantity of paraffin alone.

As a content of 7% of wax in a solution has been found to permit an efficient application of wax to fresh fruits and vegetables, it may be noted that where the wax in such a solution is a paraffin having a melting point of 118° F. the wax starts to cloud and come out of solution when the temperature of the latter descends to 44° F. While the waxing of fruit with wax solutions is employed mostly in semi-tropical areas, still, the atmospheric temperature in any of these areas is likely to go down without warning to as low as 34° F. and sometimes below this. In order to be commercially practical, this process, therefore, has to operate satisfactorily at a temperature of 34° F.

Specific examples will now be given of solutions produced in the light of my discovery, in which the cloud point has been reduced below the minimum temperature of 34° F. In these examples, I employ various mixtures of spermaceti, paraffin and coconut fat which have proved quite suitable for the present invention. In the formulas given, the letter "A" indicates animal wax; "M", mineral wax; and "V", vegetable wax.

3% coconut fat (V) plus 4% paraffin (M) has cloud point of 29° F.

3% coconut fat (V) plus 4% spermaceti (A) has cloud point of 30° F.

2% coconut fat (V) plus 3% paraffin (M) plus 2% spermaceti (A) has cloud point of 27° F.

3% spermaceti (A) plus 4% paraffin (M) has cloud point of 32° F.

The last of the above formulas, although having the highest cloud point, has been found preferable for commercial operations in California. Since making my discovery, this formula, in which the paraffin has a melting point of 118° F. and in which the solvent used is known as "rubber solvent A" (refined by the Shell Oil Company of California) has been universally used in the commercial practice of the waxing process of my invention in the waxing of citrus fruit, cantaloupes, tomatoes and other fresh fruits and vegetables in California. Rubber solvent A is an organic petroleum hydrocarbon product with a boiling range of approximately 173° F. to 222° F.

Rubber solvent A is described as item No. 32 of Table 19, "Characteristics of various petroleum naphthas," appearing on page 43 of the publication "Natural Resins," published in 1937 by American Gum Importers Association, Inc., 360 Furman Street, Brooklyn, New York.

In connection with this particular formula, it is to be noted that in the experiments leading up to my discovery I tried out a solution of 7% spermaceti wax in the solvent but found that while this solution produced a much better shine on the product than a solution of paraffin, it gave only a very slight amount of shrinkage control. I also found that the cloud point of a solution of 7% of spermaceti wax was approximately 40° F.

When, in accordance with my discovery, I then made a solution of a mixture of 3% spermacetti wax and 4% paraffin wax, I discovered that not only was the cloud point reduced to 32° F. but that the shrinkage control produced by the use of this solution was practically equivalent to that produced by the solution containing 7% of paraffin alone.

What I claim is:

1. A method of waxing fresh fruit which consists in proportionately mixing with a volatile organic solvent two waxes soluble therein to form a clear solution, one of said waxes being a mineral and the other a non-mineral wax, said mixed and dissolved waxes together constituting from five to ten percent of the solution, applying said solution to outer surfaces of said fruit, and permitting the solvent to evaporate from the solution so applied, whereby to permit substantial reduction in the amount of solvent required and to materially lower the precipitation temperature of the wax mixture solution to insure uniform application thereof to the fruit for preserving and improving the appearance thereof.

2. A method of waxing fresh fruit which consists in spraying onto said fruit a clear solution in a volatile organic solvent of a dissolved proportionate mixture of paraffin and spermaceti waxes together constituting substantially seven percent of the solution, whereby to permit substantial reduction in the amount of solvent required and to materially lower the precipitation temperature of the wax mixture solution to insure uniform application thereof to the fruit for preserving and improving the appearance thereof.

3. A method of waxing fresh fruit which consists in spraying onto said fruit a clear solution in a volatile organic solvent of a dissolved proportionate mixture of paraffin and spermaceti waxes in quantities insufficient to cause the solution to drip from the fruit, the proportion of spermaceti wax to the paraffin wax in said solution being approximately as three is to four and together constituting less than ten percent of the solution, and allowing the solvent to evaporate from the applied solution to deposit the mixture of waxes from the applied solution onto the fruit, whereby to materially lower the precipitation temperature of the mixture solution to substantially 34° Fahr. so as to permit said composition to be used within a wide range of temperature conditions for coating fruit to preserve and enhance the appearance of the same.

4. A fruit waxing composition comprising a clear solution in a volatile organic solvent of combined paraffin and spermaceti waxes, the proportion of spermaceti wax to the paraffin wax in said solution being approximately as three is to four, whereby to materially lower the precipitation temperature of the mixture solution to substantially 34° Fahr., so as to permit said composition to be used within a wide range of temperature conditions for coating fruit to preserve and enhance the appearance of the same.

5. A fruit waxing composition comprising a clear solution in a volatile organic solvent of a proportionate mixture of mineral and animal waxes together constituting from 5 to 10 percent of the solution to permit substantial reduction in the amount of solvent required and to materially lower the precipitation temperature of the wax mixture solution to insure uniform application thereof to the fruit for preserving and improving the appearance thereof.

6. A fruit waxing composition comprising a clear solution in a volatile organic solvent of a dissolved proportionate mixture of paraffin and spermaceti waxes together constituting substantially seven percent of the solution to permit substantial reduction in the amount of solvent required and to materially lower the precipitation temperature of the wax mixture solution to insure uniform application thereof to the fruit for preserving and improving the appearance thereof.

JAGAN N. SHARMA.